(12) United States Patent
Cohen et al.

(10) Patent No.: US 10,706,518 B2
(45) Date of Patent: Jul. 7, 2020

(54) DUAL CAMERA SYSTEM WITH IMPROVED VIDEO SMOOTH TRANSITION BY IMAGE BLENDING

(71) Applicant: Corephotonics Ltd., Tel-Aviv (IL)

(72) Inventors: Noy Cohen, Tel-Aviv (IL); Nadav Geva, Tel-Aviv (IL); Anat Leshem, Tel-Aviv (IL); Oded Gigushinski, Herzlia (IL); Ephraim Goldenberg, Ashdod (IL); Gal Shabtay, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/770,336

(22) PCT Filed: Jul. 4, 2017

(86) PCT No.: PCT/IB2017/054037
§ 371 (c)(1),
(2) Date: Apr. 23, 2018

(87) PCT Pub. No.: WO2018/007951
PCT Pub. Date: Jan. 11, 2018

(65) Prior Publication Data
US 2019/0122349 A1 Apr. 25, 2019

Related U.S. Application Data

(60) Provisional application No. 62/359,369, filed on Jul. 7, 2016.

(51) Int. Cl.
*H04N 5/225* (2006.01)
*H04N 5/235* (2006.01)
(Continued)

(52) U.S. Cl.
CPC ............. *G06T 5/50* (2013.01); *H04N 5/2258* (2013.01); *H04N 5/265* (2013.01); *G06T 2207/20221* (2013.01)

(58) Field of Classification Search
CPC . G06T 5/50; G06T 2207/20221; H04N 5/265; H04N 5/2258
See application file for complete search history.

(56) References Cited

U.S. PATENT DOCUMENTS 4,199,785 A    4/1980 McCullough et al.
5,005,083 A    4/1991 Grage et al.
(Continued)

FOREIGN PATENT DOCUMENTS

AU    2015258346 A1    6/2017
CN    101276415 A    10/2008
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Shahbaz Nazrul
(74) *Attorney, Agent, or Firm* — Nathan & Associates; Menachem Nathan

(57) ABSTRACT

Methods that provide a smooth transition in switching a dual-camera output from an output of a first sub-camera to an output of a second sub-camera comprise forming at least one composite image based on a weighted combination of a first sub-camera image and a second sub-camera image, switching the dual-camera output from an image based on the first sub-camera image to an image based on the at least one composite image, and further switching the dual-camera
(Continued)

output from the image based on the at least one composite image to an image based on the second sub-camera image.

5 Claims, 1 Drawing Sheet

(51) Int. Cl.
 *G06T 5/50* (2006.01)
 *H04N 5/265* (2006.01)

(56) References Cited

U.S. PATENT DOCUMENTS

| | | | |
|---|---|---|---|
| 5,032,917 A | 7/1991 | Aschwanden | |
| 5,041,852 A | 8/1991 | Misawa et al. | |
| 5,051,830 A | 9/1991 | von Hoessle | |
| 5,099,263 A | 3/1992 | Matsumoto et al. | |
| 5,248,971 A | 9/1993 | Mandl | |
| 5,287,093 A | 2/1994 | Amano et al. | |
| 5,436,660 A | 7/1995 | Sakamoto | |
| 5,444,478 A | 8/1995 | Lelong et al. | |
| 5,459,520 A | 10/1995 | Sasaki | |
| 5,657,402 A | 8/1997 | Bender et al. | |
| 5,682,198 A | 10/1997 | Katayama et al. | |
| 5,768,443 A | 6/1998 | Michael et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,208,765 B1 | 3/2001 | Bergen | |
| 6,268,611 B1 | 7/2001 | Pettersson et al. | |
| 6,357,047 B1 * | 3/2002 | Kurtze | H04N 5/262 |
| | | | 345/629 |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,803,990 B2 | 8/2014 | Smith | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |
| 9,851,803 B2 | 12/2017 | Fisher et al. | |
| 9,894,287 B2 | 2/2018 | Qian et al. | |
| 9,900,522 B2 | 2/2018 | Lu | |
| 9,927,600 B2 | 3/2018 | Goldenberg et al. | |
| 2002/0005902 A1 | 1/2002 | Yuen | |
| 2002/0030163 A1 | 3/2002 | Zhang | |
| 2002/0063711 A1 | 5/2002 | Park et al. | |
| 2002/0075258 A1 | 6/2002 | Park et al. | |
| 2002/0122113 A1 | 9/2002 | Foote | |
| 2002/0167741 A1 | 11/2002 | Koiwai et al. | |
| 2003/0030729 A1 | 2/2003 | Prentice et al. | |
| 2003/0093805 A1 | 5/2003 | Gin | |
| 2003/0160886 A1 | 8/2003 | Misawa et al. | |
| 2003/0202113 A1 | 10/2003 | Yoshikawa | |
| 2004/0008773 A1 | 1/2004 | Itokawa | |
| 2004/0012683 A1 | 1/2004 | Yamasaki et al. | |
| 2004/0017386 A1 | 1/2004 | Liu et al. | |
| 2004/0027367 A1 | 2/2004 | Pilu | |
| 2004/0061788 A1 | 4/2004 | Bateman | |
| 2004/0141086 A1 | 7/2004 | Mihara | |
| 2004/0240052 A1 | 12/2004 | Minefuji et al. | |
| 2005/0013509 A1 | 1/2005 | Samadani | |
| 2005/0046740 A1 | 3/2005 | Davis | |
| 2005/0157184 A1 | 7/2005 | Nakanishi et al. | |
| 2005/0168834 A1 | 8/2005 | Matsumoto et al. | |
| 2005/0200718 A1 | 9/2005 | Lee | |
| 2006/0054782 A1 | 3/2006 | Olsen et al. | |
| 2006/0056056 A1 | 3/2006 | Ahiska et al. | |
| 2006/0082663 A1 | 4/2006 | Rooy et al. | |
| 2006/0102907 A1 | 5/2006 | Lee et al. | |
| 2006/0125937 A1 | 6/2006 | LeGall et al. | |
| 2006/0170793 A1 | 8/2006 | Pasquarette et al. | |
| 2006/0175549 A1 | 8/2006 | Miller et al. | |
| 2006/0187310 A1 | 8/2006 | Janson et al. | |
| 2006/0187322 A1 | 8/2006 | Janson et al. | |
| 2006/0187338 A1 | 8/2006 | May et al. | |
| 2007/0024737 A1 | 2/2007 | Nakamura et al. | |
| 2007/0025714 A1 | 2/2007 | Shiraki | |
| 2007/0126911 A1 | 6/2007 | Nanjo | |
| 2007/0177025 A1 | 8/2007 | Kopet et al. | |
| 2007/0188653 A1 | 8/2007 | Pollock et al. | |

(56) References Cited

U.S. PATENT DOCUMENTS

| | | |
|---|---|---|
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0117316 A1 | 5/2008 | Orimoto |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0238327 A1 | 9/2010 | Griffith et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0076922 A1 | 3/2013 | Shihoh et al. |
| 2013/0093842 A1 | 4/2013 | Yahata |
| 2013/0113894 A1 | 5/2013 | Mirlay |
| 2013/0135445 A1 | 5/2013 | Dahi et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0253543 A1 | 9/2015 | Mercado |
| 2015/0253647 A1 | 9/2015 | Mercado |
| 2015/0271471 A1 | 9/2015 | Hsieh et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0230585 A1* | 8/2017 | Nash ............ H04N 5/23241 |
| 2017/0242225 A1 | 8/2017 | Fiske |
| 2017/0289458 A1 | 10/2017 | Song et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0241922 A1 | 8/2018 | Baldwin et al. |
| 2018/0295292 A1 | 10/2018 | Lee et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2011085666 A | 4/2011 |
| JP | 2013106289 A | 5/2013 |
| JP | 2015185962 A | 10/2015 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20150118012 A | 10/2015 |
| WO | 2008093277 A2 | 8/2008 |
| WO | 2010122841 A1 | 10/2010 |
| WO | 2014072818 A2 | 5/2014 |
| WO | 2017025822 A1 | 2/2017 |

(56) References Cited

FOREIGN PATENT DOCUMENTS

| WO | 2017037688 A1 | 3/2017 |
|---|---|---|
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
International Search Report and Written Opinion in related PCT patent application PCT/IB2017/054037, dated Nov. 28, 2017.
Office Action in related EP patent application 17823744.2, dated May 9, 2019. 4 Pages.

* cited by examiner

DUAL CAMERA SYSTEM WITH IMPROVED VIDEO SMOOTH TRANSITION BY IMAGE BLENDING

CROSS REFERENCE TO RELATED APPLICATIONS

This application is a 371 application from international patent application PCT/IB2017/054037 filed Jul. 4, 2017, and claims priority from U.S. Provisional Patent Application No. 62/359,369 filed Jul. 7, 2016, which is incorporated herein by reference in its entirety.

BACKGROUND

Co-assigned U.S. Pat. No. 9,185,291 teaches a zoom dual-camera system with smooth transition between two sub-cameras in video mode during zooming-in and zooming-out. Exemplarily, one sub-camera is a "Wide" sub-camera with a Wide field of view ($FOV_W$) and the other sub-camera is a "Tele" sub-camera with a Tele FOV ($FOV_T$) narrower than $FOV_W$.

In known art, optical zoom is achieved in video mode "without fusion", by switching between frames of the two sub-cameras. To avoid discontinuities in video mode, the switching includes applying additional processing blocks, for example image scaling and shifting. When zooming-in or zooming-out, the transition from one sub-camera to the other sub-camera occurs within one frame. For example, when a user-determined (or "user-defined") zoom factor (ZF) is below a certain threshold denoted ZF_transition_threshold, the dual-camera image output to the observer (i.e. the image seen by the observer, also referred the as "camera output image") is taken from a stream of frames output by one sub-camera, with additional processing applied to it, including shift, scale, color correction, white balance, etc. When the user-determined ZF is equal to or greater than ZF_transition_threshold, the camera output image is taken from is taken from a stream of frames output by the other sub-camera, with additional processing applied to it, including shift, scale, color correction, white balance, etc.

This shift in sub-camera output can result in a discontinuity observed by the observer in the stream of camera output images when the transition occurs. This discontinuity may be visible in object position change, point of view shift, color change, etc. In known art, this discontinuity is minimized by applying shift, scale, color correction etc. to the stream of frames from the two sub-cameras. While solutions to mitigate the discontinuity effect have been suggested by at least some of the present inventors, e.g. in U.S. Pat. No. 9,185,291, improvements in the transition process to further mitigate the discontinuity are still required.

SUMMARY

Embodiments disclosed herein teach improvements of smooth transition between two sub-cameras in a dual-camera system in video mode, whereby the transition appears smoother to an observer. As used herein, "smooth transition" refers to a process applied on the frames of each sub-camera such that the transition of the (dual) camera output from a frame based on the output of one sub-camera to a frame based on the output of another sub-camera is as unnoticeable as possible.

In an exemplary embodiment, there is provided a method for switching a dual-camera output from an output of a first sub-camera to an output of a second sub-camera, comprising forming at least one composite image based on a weighted combination of a first sub-camera image and a second sub-camera image, switching the dual-camera output from an image based on the first sub-camera image to an image based on the at least one composite image, and further switching the dual-camera output from the image based on the at least one composite image to an image based on the second sub-camera image.

In an exemplary embodiment, the at least one composite image includes a single composite image.

In an exemplary embodiment, the at least one composite image includes a plurality of composite images, the switching a dual-camera output from an image based on the first sub-camera image to an image based on the at least one composite image includes switching to a first image of the plurality of composite images and the switching the dual-camera output from the image based on the at least one composite image to an image based on the second sub-camera image includes switching the dual-camera output from a last image of the plurality of composite images.

In an exemplary embodiment, the weighted combination uses a first weight for the first sub-camera output and a second weight for the second sub-camera output, and the first and second weights add up to 1.

In an exemplary embodiment, the weighted combination uses a first weight for the first sub-camera output and a second weight for the second sub-camera output, and the first and second weights are different in each of the plurality of the composite images.

In various exemplary embodiments, the first and second weights add up to 1.

In an exemplary embodiment, the first and second weights depend on time.

In an exemplary embodiment, the first and second weights depend on factors other than time.

BRIEF DESCRIPTION OF THE DRAWINGS

Aspects, embodiments and features disclosed herein will become apparent from the following detailed description when considered in conjunction with the accompanying drawings, in which.

DETAILED DESCRIPTION

Figure 1:
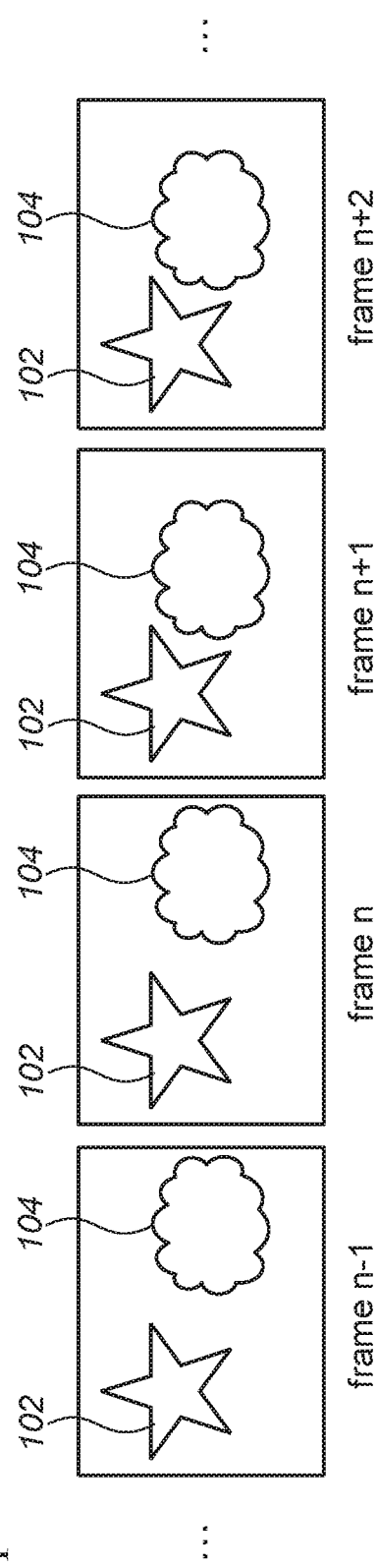
FIG. 1 shows a dual-camera output stream of images obtain using known-art transition.

Embodiments disclosed herein offer improved methods for mitigating a discontinuity observed by an observer in a stream of dual-camera camera output images (also referred to as a stream of dual-camera frames) when a transition occurs from an output image (or an output stream of frames) obtained from one sub-camera to an output image (or an output stream of frames) obtained from the other sub-camera. As used herein, any of the terms "output image", "camera output image" and "dual-camera output image" refers to the actual dual-camera image seen by the user. Such a transition may occur when switching the dual-camera output from the output of one sub-camera to the output of the other sub-camera. In an exemplary embodiment, a method performs the following: when a user-defined ZF requires a sub-camera output switch from a first sub-camera output to a second sub-camera output, for a certain period of time the dual-camera output image is a weighted combination of the two sub-camera outputs (instead of an abrupt switch from the first sub-camera output to the second sub-camera output). The weighting is a function of time, scene parameters such as depth range, lighting conditions, motion, color information, luminance levels, focus position, gyro data, power consumption, device heating and zoom factor. For example, the certain period of time may span 10 frames, during which 10 frames the first frame in the stream of frames coming from the two sub-cameras will have high weight for the first sub-camera output and small weight for the second sub-camera output, the second frame in the stream of frames coming from the two sub-cameras will have a somewhat lower weight for the first sub-camera output and somewhat higher weight for the second sub-camera output than in the first frame, etc. In other words, subsequent frames have gradually decreasing weight for the first sub-camera output and increasing weight for the second sub-camera output, until, after the last frame, the output will be only from the second sub-camera output.

In an exemplary embodiment, the two weights that weigh the first sub-camera output and the second sub-camera output add up to 1.

In an exemplary embodiment, the dual-camera output image is calculated according to the following formula:

$$Out(x,y)=\alpha(t)In_1(x,y)+(1-\alpha(t))In_2(x,y), \quad (1)$$

where Out(x,y) is the camera output image value at position (x,y), $\alpha(t)$ is the weight which changes as a function of time t, $In_1(x,y)$ is the output image from the first sub-camera and $In_2(x,y)$ is the output image from the second sub-camera.

In an exemplary embodiment, $\alpha(t)$ is defined according to the following formula:

$$\alpha(t) = \frac{(t_e - t_s) - (t - t_s)}{(t_e - t_s)}, \quad (2)$$

where $t_s$ is the transition period start time, equal to the time when the user-defined ZF crosses ZF_transition_threshold either from a lower ZF than ZF_transition_threshold to a higher ZF than ZF_transition_threshold, or vice versa, and $t_e$ is the time when the transition period ends. In other embodiments, $\alpha(t)$ may be defined by any other dependency on t that provide an $\alpha$ value close to 1 for $t_s$ and that gradually increases $\alpha(t)$ to a value close to 0 for $t_e$.

In another embodiment, the camera output image is calculated according to the following formula:

$$O_n(x,y)=\alpha_n(n,x,y,ZF,W_n(x,y),T_n(x,y)\ldots)P_n\{W_n(x,y)\}+(1-\alpha_n(n,x,y,ZF,W_n(x,y),T_n(x,y)\ldots))Q_n\{T_n(x,y)\} \quad (3)$$

where $W_n$ and $T_n$ are the $n^{th}$ frames in the stream we receive for the wide and tele, $P_n$ and $Q_n$ are spatial transformations (e.g. projective transformation on the frames), and $\alpha_n(n, x, y, ZF \ldots)$ is a weighting factor. The blending function may depend, for example, on time, on spatial coordinates, on the zoom factor, on the pixels values of each frame, etc. The a function returns a value between 0 and 1. Note that in contrast with the dependency of weight a on time in Eq. 2, in Eq. (3) the dependency of the weights may be on factors other than time.

Figure 2:
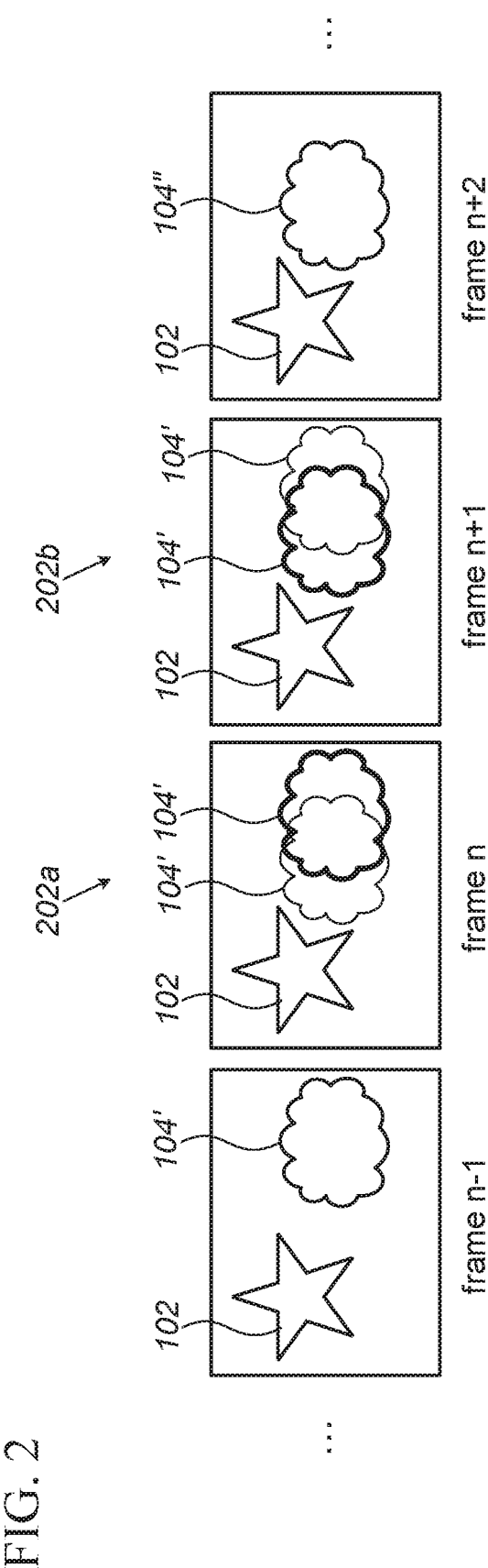
FIG. 2 shows a dual-camera output stream of images using an embodiment of a transition method disclosed herein.

FIG. 1 shows the dual-camera output stream of images when using known-art transition. Each image includes a star 102 and a cloud 104. In frames n−1 and n, the dual-camera output is output from the first sub-camera. The output of the second sub-camera becomes the dual-camera output in frame n+1 (i.e. the "transition" from the first sub-camera output to the second camera output is in frame n+1), and there is a clear difference in the scene shown by these two frames: in frame n, star 102 and cloud 104 are separated by a larger (and noticeable) distance than in frame n+1. That is, cloud 104 "jumps" relative to star 102 when going from frame n to frame n+1. In contrast, FIG. 2 illustrates a much smoother transition. In FIG. 2, the transition starts with a dual-camera output frame n, in which the output image is already a "composite image" 202a of a weighted combination of the two sub-camera outputs, an output of the first sub-camera with a star 102 and a cloud 104' and an output of the second sub-camera with a star 102 and a cloud 104". For example, in frame n, composite image 202a includes a 90% weight for the first sub-camera output (i.e. 90% weight of cloud 104 in the form of a cloud 104') and a 10% weight for the second camera output (i.e. 10% weight of cloud 104 in the form of a cloud 104"). In the following frame, n+1, the output image is a "composite image" 202b of a weighted combination of the two sub-camera outputs in which the weighting is changed to (for example) a 10% weight of cloud 104 in the form of a cloud 104' for the first sub-camera output and a 90% weight of cloud 104 in the form of a cloud 104" for the second sub-camera output. In frame n+2, the camera output image is the second sub-camera output only. Clearly the transition from frame n−1 to frame n+1 is much smoother in FIG. 2 than in FIG. 1. The transition itself may involve a single frame with a composite image (with for example 50%-50% weights) or a plurality of such frames, each having successive smaller weights for the first sub-camera image and larger weights for the second sub-camera image.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A method of zooming in a zoom dual-camera that includes a first sub-camera and a second sub-camera, the method comprising: during switching in video mode from output images of the first sub-camera to output images of the second sub-camera,
   a) applying scaling on the output images of the first sub-camera according to a changing zoom factor (ZF) when the ZF changes from a lower ZF to a higher ZF or vice versa to obtain a first image stream with scaled images;
   b) applying shifting on the output images of the second sub-camera according to the changing ZF to obtain a second image stream with shifted images;
   c) when a ZF-transition-threshold is reached, generating a third image stream comprising a predefined number of images, wherein each image of the predefined number of images is based on a weighted combination On(x,y) of values of corresponding pixels in an image from the first image stream and a corresponding image from the second image stream $$O_n(x,y) = \alpha_n(n,x,y,ZF,W_n(x,y),T_n(x,y)\ldots)P_n\{W_n(x,y)\} + (1-\alpha_n(n,x,y,ZF,W_n(x,y),T_n(x,y)\ldots))Q_n\{T_n(x,y)\}$$

wherein x and y are spatial coordinates, $n \geq 1$, $W_n$ and $T_n$ are $n^{th}$ frames in the third image stream, $P_n$ and $Q_n$ are spatial transformations and $a_n$ is a weighting factor dependent on n, x, y and ZF;

d) switching an output image stream of the dual-camera from the first image stream to the third image stream; and e) further switching the output image stream of the dual-camera from the third image stream to the second image stream.

2. The method of claim 1, wherein the applying shifting on output images of the second sub-camera according to the changing ZF further includes scaling of output images of the second sub-camera according to the changing ZF.

3. The method of claim 1, wherein the predefined number of images includes a single composite image.

4. The method of claim 1, wherein during zooming-in operation when the zooming is from a lower ZF to a higher ZF, the first sub-camera is a Wide sub-camera and the second sub-camera is a Tele sub-camera.

5. The method of claim 1, wherein when the zooming is from a higher ZF to a lower ZF, the first sub-camera is a Tele sub-camera and the second sub-camera is a Wide sub-camera.

* * * * *